United States Patent
Mittal et al.

(10) Patent No.: US 7,321,386 B2
(45) Date of Patent: Jan. 22, 2008

(54) ROBUST STEREO-DRIVEN VIDEO-BASED SURVEILLANCE

(75) Inventors: Anurag Mittal, Plainsboro, NJ (US); Nikolaos Paragios, Plainsboro, NJ (US); Visvanathan Ramesh, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 834 days.

(21) Appl. No.: 10/632,002

(22) Filed: Jul. 31, 2003

(65) Prior Publication Data

US 2004/0125207 A1 Jul. 1, 2004

Related U.S. Application Data

(60) Provisional application No. 60/400,185, filed on Aug. 1, 2002.

(51) Int. Cl.
*H04N 5/225* (2006.01)
(52) U.S. Cl. ...................................................... 348/169
(58) Field of Classification Search .................... None
See application file for complete search history.

(56) References Cited

U.S. PATENT DOCUMENTS

| | | | | |
|---|---|---|---|---|
| 5,963,664 A * | 10/1999 | Kumar et al. | ............... | 382/154 |
| 6,353,678 B1 * | 3/2002 | Guo et al. | ................... | 382/154 |
| 6,396,961 B1 * | 5/2002 | Wixson et al. | .............. | 382/294 |
| 6,774,889 B1 * | 8/2004 | Zhang et al. | ............... | 345/173 |
| 6,928,194 B2 * | 8/2005 | Mai et al. | ................... | 382/284 |
| 6,963,662 B1 * | 11/2005 | LeClerc et al. | ............. | 382/154 |

* cited by examiner

*Primary Examiner*—Nhon Diep
(74) *Attorney, Agent, or Firm*—Donald B. Paschburg; F. Chau & Associates, LLC

(57) ABSTRACT

A method of tracking an object comprises providing a plurality of cameras, determining an image from each camera, and determining a common plane in the images. The method further comprises determining a parallax for scene points across the images, incorporating the parallax as a feature in a background model, and estimating a change in the scene using the background model. A camera can be a pan-tilt-zoom camera. A camera can be uncalibrated.

20 Claims, 7 Drawing Sheets

ROBUST STEREO-DRIVEN VIDEO-BASED SURVEILLANCE

This application claims the benefit of U.S. Provisional Application No. 60/400,185, filed Aug. 1, 2002, which is incorporated by reference herein in its entirety.

BACKGROUND OF THE INVENTION

1. Field of the Invention

The present invention relates to computer vision, and more particularly to multiple camera video surveillance.

2. Discussion of Related Art

Monocular vision is the most common clue used in video-based surveillance. Installation, maintenance costs and computational complexity issues have constrained the use and deployment of stereo sequences in video-based surveillance. The reduction of video sensor cost and the evolution of computational power will position stereo-based information to be a major component in video-based surveillance. A single camera is able to do moving object recognition. However, it is difficult to deal with sudden changes in illumination, specularities, shadows etc.

Therefore, a need exists for a stereo-driven video-based surveillance system and method.

SUMMARY OF THE INVENTION

According to an embodiment of the present invention, a method of tracking an object comprises providing a plurality of cameras, determining an image from each camera, and determining a common plane in the images. The method further comprises determining a parallax for scene points across the images, incorporating the parallax as a feature in a background model, and estimating a change in the scene using the background model.

At least one camera is a pan-tilt-zoom camera. At least one camera is uncalibrated.

The method comprises providing a pan-tilt-zoom camera, determining a mosaic for the pan-tilt-zoom camera from images captured from the pan-tilt-zoom camera, and registering the mosaic and the images from the pan-tilt-zoom camera and the plurality of cameras according to a common plane in the scene.

The method further comprises performing inter-frame registration of images captured from the pan-tilt-zoom camera.

The background model comprises a feature. The feature is one of an intensity feature and an edge feature.

The method further comprises determining the background model by one of a mixture-of-Gaussians and a non-parametric kernel. The method comprises determining a change according to the background model.

The method comprises obtaining a height from the parallax that is invariant to the motion of the object through the scene.

The method comprises providing a control strategy for controlling the cameras such that a probability of the object being visible in a next image is maximized. An error associated with object detection and velocity is propagated to determine a maximum possible zoom at which an image of the desired region of the object may be acquired.

The method comprises obtaining a relationship between observations from different cameras via a homography relationship for the common registered plane.

The method comprises providing a control strategy for acquiring user defined relevant information for a plurality number of objects in a scene. Providing the control strategy further comprises providing a probability density function for the object, and providing a model for object motion. Providing the control strategy further comprises providing a user specification. The method further comprises controlling the cameras according to the user specification and the change in the scene.

According to an embodiment of the present invention, a system for tracking an object, comprises two or more cameras, registration module for aligning a common plane in an image obtained from each camera, parallax module for determining a parallax between views of each camera, and detection module for determining an object in a scene defined by the views of the cameras according to the parallax and a predetermined background model.

The parallax is determined between views of two cameras.

At least one camera is uncalibrated. At least one camera is a pan-tilt-zoom camera. The system comprises control strategy means for tracking the object with the pan-tilt-zoom camera.

According to an embodiment of the present invention, a program storage device is provided, readable by machine, tangibly embodying a program of instructions executable by the machine to perform method steps for tracking an object. The method comprises providing a plurality of cameras, determining an image from each camera, and determining a common plane in the images. The method further comprises determining a parallax for scene points across the images, incorporating the parallax as a feature in a background model, and estimating a change in the scene using the background model.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1:
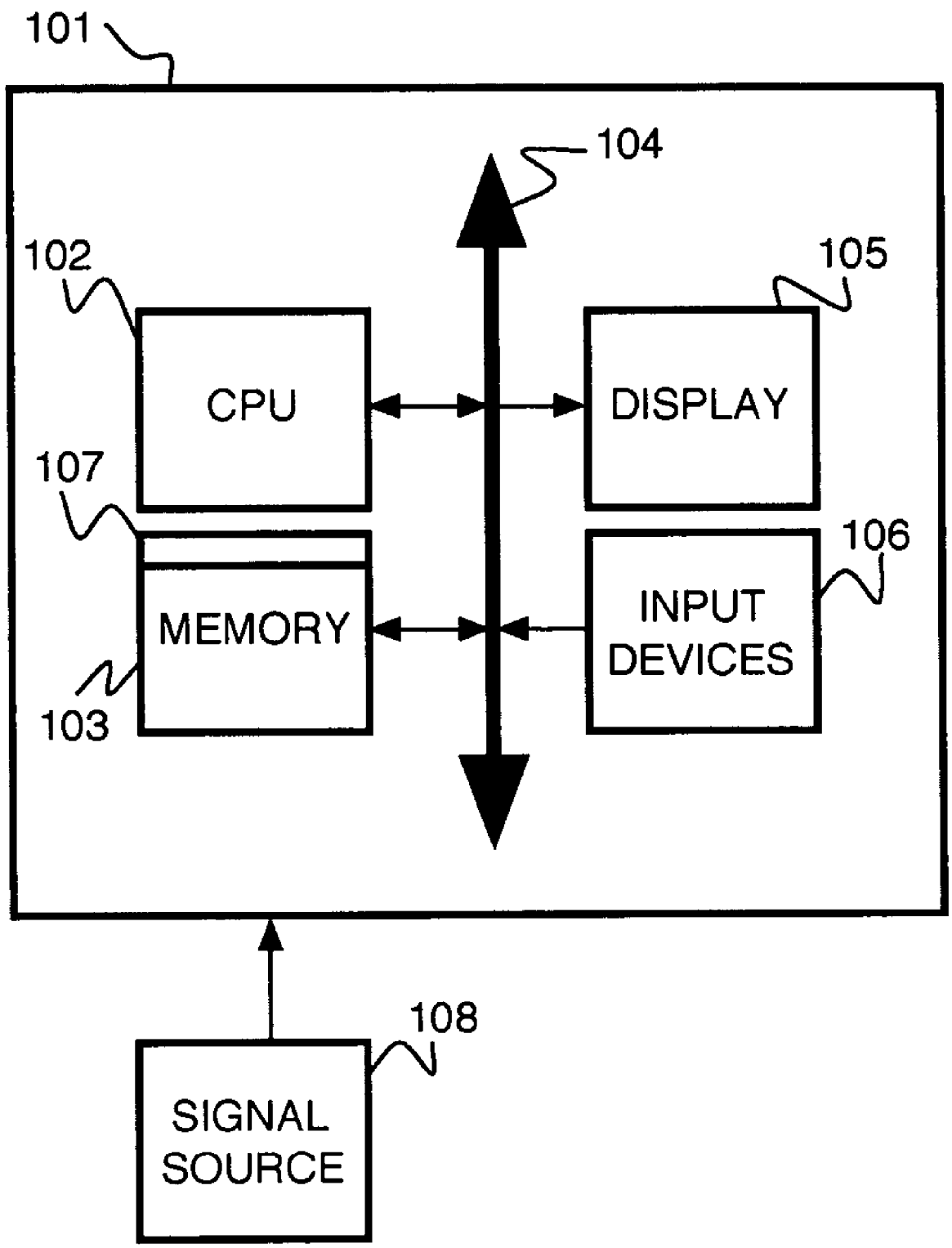
FIG. 1 is a system according to an embodiment of the present invention.

Stereo vision can be performed using a plurality of cameras if a common plane is identified in two or more views. One or more of the plurality of cameras can be uncalibrated and/or have pan-tilt-zoom (PTZ) capabilities. A ground plane is available in most scenes of interest, such as a parking lot, airport, roads etc. If the images from two cameras are aligned with each other according to a common ground plane, then a plane+parallax model corrects for the effect of relative internal parameters. Further, the relative rotation of the two cameras is cancelled out and that the resultant parallax forms an epipolar field. The resultant parallax is dependent on the structure of the scene relative to the plane and the distance between the two cameras. Registration between images captured from the same camera allow for continuous object detection in the parallax space even when both the cameras undergo PTZ motions.

From two images of a scene taken substantially simultaneously from two cameras, a single plane is aligned between the images, e.g., the ground plane. One of ordinary skill in the art would recognize in view of the present disclosure that a difference in time between when the images are taken can depend on the speed of an object desired to be tracked, e.g., a smaller difference for faster moving objects. The parallax for all points is determined, including a zero parallax for points on the plane and a finite parallax for the points not on the plane. Since the effect of internal parameters and rotation has been cancelled out and the positions of the two cameras are the same, the same parallax is obtained for the two cameras regardless of the rotation, translation, and zoom applied to the cameras. Such parallax can be incorporated into a background model that may have other features such as intensity (e.g., color or gray-scale) or edge maps. Further, the change in the scene can be estimated using the background model thus created. This can be more robust than change detection based on the color space alone.

In a general example, multiple cameras are implemented, some of which may have PTZ facility. For the PTZ cameras, mosaics can be determined from images captured from the same camera. A mosaic can be, for example, a panorama. Mosaics from different cameras are registered with each other according to a common ground plane in the scene. Any image captured from one of the cameras can then be registered against the mosaic of that camera in a robust manner so that accurate registration is obtained. This registration is performed for all (PTZ) camera views. Such registration and the planar homography between the mosaics is used to obtain a planar homography relationship between the current images captured from the different cameras. Such a relationship is robust to the presence of moving objects in the scene, errors on controlling the PTZ setting of the cameras etc.

Various configurations for the cameras can be implemented. For example, in one configuration two cameras follow an object and detect it robustly using parallax. The motion of the object is used to predict the position of the object in next time step and thus the PTZ parameters for the two cameras that will be needed to view it. Since such cameras can only look at a small part of the a scene ay a time, a third can be implemented with a wide field of view that looks at the whole scene and directs the PTZ camera to the possible targets by detecting them using intensity based background subtraction Another configuration is to have only two cameras, a static wide FOV camera and a PTZ camera. The static camera observes an area of interest and performs background adaptation to identify non-static or non-background objects. The first camera provides an initial guess and guides the focus of a second camera towards specific regions of activities. The second camera uses the initial guess from the first camera and focuses on specific regions of activity. The second camera verifies detection by using parallax between its view and the view of the first camera.

Referring to FIG. 1, it to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine 101 comprising any suitable architecture. Preferably, the machine 101 is implemented on a computer platform having hardware such as one or more central processing units (CPU) 102, a random access memory (RAM) 103 and input/output (I/O) interface(s) 104. The computer platform also includes an operating system and microinstruction code. The various processes and functions described herein may either be part of the microinstruction code or part of cbs application program (or a combination thereof) 107, which is executed via the operating system. In addition, various other peripheral devices 105/106/108 may be connected to the computer platform 101 such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

According to an embodiment of the present invention, there are two types of image registration performed: registration of a common plane between images captured by different cameras, and registration of images captured by the same camera as the camera undergoes PTZ. The registration of the common plane is more difficult to perform and subject to error since any point not belonging to the common plane will introduce bias errors in the homography obtained. The registration of images captured from the same PTZ camera is easier to perform and is more accurate since in the absence of any moving objects in the scene, an exact homography can be estimated between the obtained images. Although the presence of a moving object can distort the homography computation, there exist methods that can detect such objects and eliminate them from the data that is used to determine the homography. Furthermore, the PTZ cameras are controlled and approximate PTZ parameters are available to provide an estimate of the current parameters.

A further consideration is that if it is possible to perform the registration of images robustly, the registration a common plane only needs to be performed once. When the cameras change their PTZ parameters, the new planar homography can be determined as the concatenation of original planar homography and the homography induced by the PTZ motion of the cameras. Therefore, although it is possible to build a system that determines the planar homography for each frame, an improved approach determines the homography only once. This computation can be performed either automatically or the system can ask the user to specify this homography manually only once during initialization by specifying correspondences across the views of four points on the plane. The rest of the system then functions automatically.

As stated above, it is possible to manually specify the homography of the common plane across views only once. However, if an automatic procedure is desired for registration, a projective transformation for the transformation of a plane across two views can be used. Therefore, the pixels get transformed according to the equation:

$$\begin{pmatrix} x' \\ y' \\ w' \end{pmatrix} = \begin{pmatrix} a & b & c \\ d & e & f \\ g & h & i \end{pmatrix} \begin{pmatrix} x \\ y \\ 1 \end{pmatrix} \quad (1)$$

This equation is true up to an overall scale, and there are eight (8) free parameters. Any robust registration method can be utilized to determine this homography (e.g., projective transform). Point-based methods, for example, using RANSAC, optical flow based etc., can also be used. A direct method can be implemented for determining the model parameters that directly estimate the model parameters by gradient-descent. The direct method utilizes the image gradients over the whole image. Since the direct method cannot deal with large motions, pyramids (e.g., either intensity-based or laplacian-based) are formed from the two images by sub-sampling. Registration starts with the highest level. The registration parameters for this level are propagated down, according to an appropriate transformation, to give initial estimates of the parameters at the current level. Optimization at a given level is done using a gradient descent method, such as the Levenberg-Marquardt algorithm. To remove the effect of trees and other outliers from the estimation of the homography, regions of the images belonging to the ground plane can be identified. Prior knowledge of the scene structure (e.g., as the first camera is static) or a thresholding technique can be used to identify the regions. The thresholds are determined dynamically by building a histogram of the image and fitting a mixture of Gaussians model to the intensity profile. Prior knowledge is used to identify the Gaussians corresponding to the ground plane. For example, this is the color of the road (e.g., gray) as opposed to trees (e.g., green and/or brown) and cars. A mask is obtained from such pixel classification that helps to use the pixels belonging to the ground plane as the basis for registration. To further improve the results, robust estimators (e.g., M-estimators) are used to weigh the contribution from different pixels so that the outliers do not degrade the results significantly.

The view of a camera changes as it changes its PTZ. Since a user or its program controls the camera, the PTZ parameters are known. This information can be utilized to perform registration of the images thus obtained. However, there is often a significant error in the actual parameters. For example, when the camera zooms in on an object the pan-tilt errors are magnified. Visual information can be utilized for correcting such errors. The correction can have sub-pixel accuracy. An important characteristic of PTZ cameras is that, if the scene is sufficiently far away from the camera, camera motion can be approximated by rotations and/or zoom such that there is no change in the camera center and hence, no parallax. Provided that the scene is static, an exact homography exists between the images, which can be estimated by known image registration techniques. Even in the presence of moving objects, accurate (e.g., subpixel) registration is possible by automatically detecting moving objects and eliminating their influence on the registration.

Once the images captured from the two cameras have been plane aligned, the residual image motion is due only to the translational motion of the camera and to the deviations of the scene structure from the planar surface. Effects of camera rotation or changes in camera calibration are eliminated by the plane stabilization. Hence, the residual image motion forms a radial flow field centered at the single epipole. Thus, the only ambiguity remaining in the epipolar geometry between the two images is the position of the epipole. Determination of this point is sufficient in reducing the general two dimensional (2D) search for point matches to a one dimensional (1D) search along the line joining the current point with the epipole (e.g., the epipolar line).

The determination of the epipolar geometry is performed once. All other effects due to the PTZ of each camera are cancelled by the inter-frame registration within each camera view. Such epipolar geometry may be determined initially either manually by specification of point matches, or automatically by automatic calculation of point matches.

Figure 2:
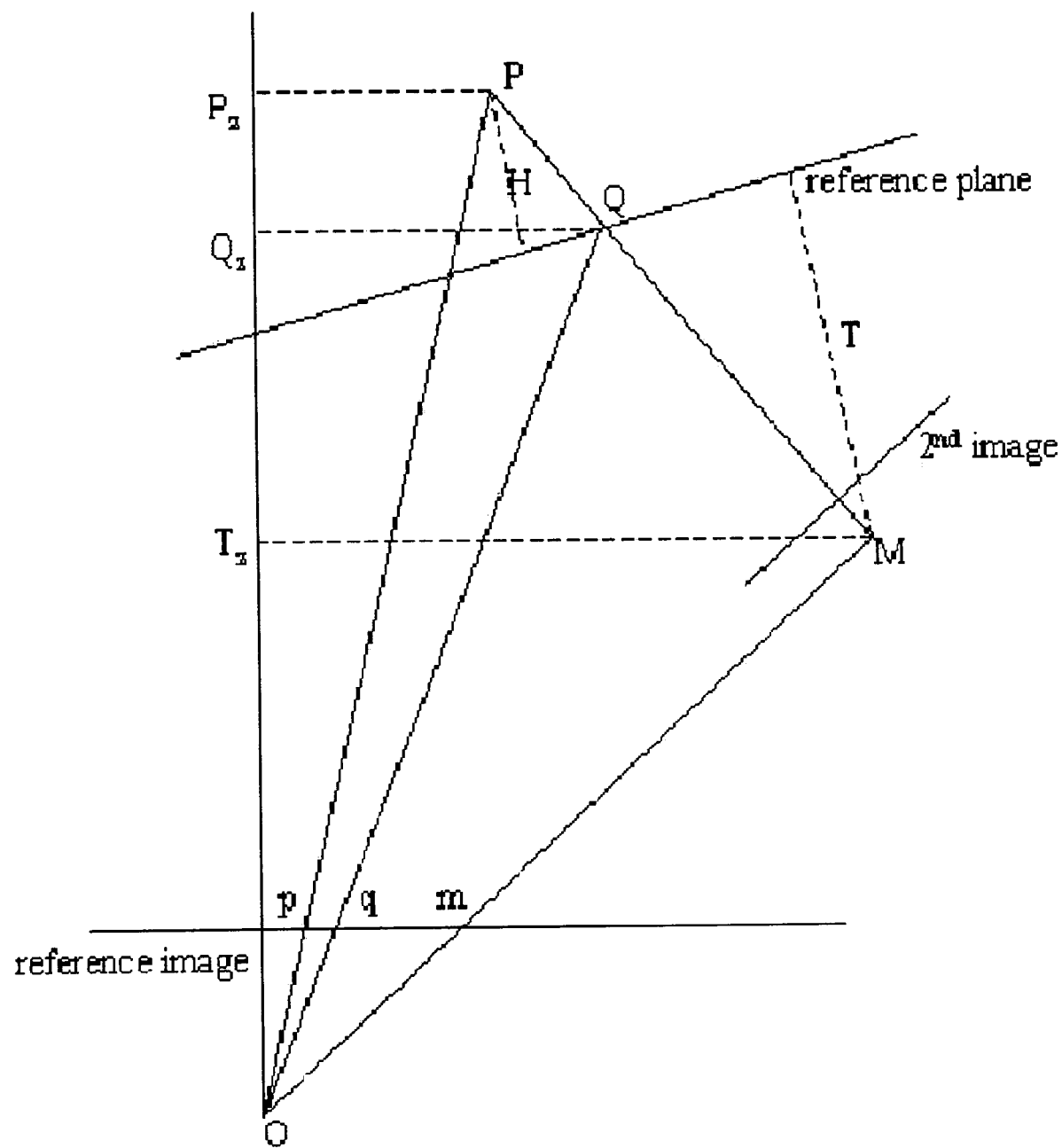
FIG. 2 is an illustration of a residual parallax when a plane is aligned between two views according to an embodiment of the present invention.

The residual image motion after plane alignment obeys certain properties. Referring to FIG. 2, by way of example, let P be a point not on the plane that is registered, and let p be its image in a reference view. Let $T_1$ denote the baseline vector between the cameras and Q be the point where the ray connecting P to the second camera center intersects the surface. Then the residual parallax displacement δu at image location p can be shown to be $$\delta u = q - p = \frac{T_z(Q_z - P_z)}{Q_z(P_z - T_z)}(p - t_1)$$

where $P_z$ and $Q_z$ denote the depths of points P and Q, $T_z$ is the z component of translation vector $T_1$, and $t_1$ denotes the epipole corresponding to $T_1$. If the surface that is aligned is a plane, then the residual parallax displacement simplifies in the case of $T_z$ γ0 to:

$$\delta u = \frac{HT_z(p - t_1)}{T_\perp P_z - HT_z} = \frac{HT_z}{T_\perp P_z}(q - t_1) \quad (2)$$

and in the case of $T_z = 0$ to:

$$\delta u = -\frac{fH}{T_\perp P_z}\vec{T}_1 \quad (3)$$

where H is the perpendicular distance from the point P to the reference plane, $T_{195}$ is the perpendicular distance between the second camera center M and the reference plane.

For obtaining parallax, points are matched along the epipolar field. This is the classic stereo problem. According to an embodiment of the present invention there are advantages that are utilized. For example, the objects are typically not very far from the aligned plane. This has the effect of reducing the search space drastically. Also, since the objects are typically only on one side of the plane (for example, objects cannot be located below the ground), the parallax is further constrained only along one direction. Furthermore, concurrent acquisition of the two images alleviates the problem of a change in illumination. Once the epipolar geometry is known any stereo method can be utilized. Alternatives include, for example, graph cuts, dynamic programming, and the layered approach. Many of the methods, however, are slow and unsuitable for real-time applications. According to an embodiment of the present invention, a dynamic programming method is used. The dynamic programming method uses the ordering and uniqueness constraint and matches points along an epipolar line as a group. Smoothness constraints across these lines are not used.

Figure 3A:
FIGS. 3a and 3b are two images taken simultaneously from two cameras according to an embodiment of the present invention.
Figure 3B:

After determining the parallax between the two views (for example. see FIGS. 3a and 3b), changes in the parallax space are identified. Parallax at a particular point is dependent only on the structure of the scene and is insensitive to changes in illumination, shadows, specularities etc. Therefore, it is more robust than intensity based methods. Objects can be identified as regions with a different parallax than the background. This can be further combined with intensity-based methods to obtain detection. According to an embodiment of the present invention, parallax is used with uncalibrated PTZ cameras. A probability density function (pdf) is determined for the observed parallax (e.g., along with intensity) at a pixel. Such density may be estimated by several techniques such as the mixture-of-Gaussians or Non-parametric kernels.

Prior shape knowledge of the geometrical structures of the scene and the desired objects is used. Integration of intensity information as well as stereoscopic measures are used. The tracking algorithm is integrated with the information obtained through the stereo system and 3D object models to guarantee performance and reduce a number of false alarms. Since the system is uncalibrated, the parallax provides information only up to a projective transformation. If some additional information is provided (such as specification of 3D information for the ground plane), this can be further refined either up to an overall scale or even an exact measurement if further information is available.

According to the available information (up to some transformation), detection of objects can then be performed by using the 3D models and distance measures between the models using parallax that are invariant to this unknown transformation. Such measures are more accurate than traditional methods since the effect of changes in visual information has been factored out and only the shape information is utilized.

Such detection can be further utilized to perform event detection tasks. For example, detection of abandoned objects can be performed with high accuracy using stereo information. Such a system can provide some abstract description of the events, recognition of the basic structures of interest (e.g., planes, trucks, etc) and can exhibit dynamic intelligent behavior (e.g., detection and zooming onto abandoned items, tracking of objects of interest, etc.). This information can be transmitted selectively to the control center in a qualitative manner by notifying the users for possible events of interest. Furthermore, feedback from the control center can be considered by allowing the user to interact with the system when events of interest are detected.

To develop some concepts in detection using parallax, when $T_z 6=0$, obtained parallax is given by:

$$\delta u = \frac{HT_z(p - t_1)}{T_\perp P_z - HT_z} = \frac{HT_z}{T_\perp P_z}(q - t_1) \quad (4)$$

When $T_z = 0$, Equation 4 changes to:

$$\delta u = -\frac{fH}{T_\perp P_z}\vec{T}_1 \quad (5)$$

Figure 4:
FIG. 4 is a warped image of FIG. 3b, wherein a ground plane is aligned to a ground plane of FIG. 3a, according to an embodiment of the present invention.
Figure 5:
FIG. 5 is a disparity map between FIGS. 3a and 4, according to an embodiment of the present invention.

In these equations, $T_z$ and $T_\zeta$ are the same for all points in the scene, while H and $P_z$ vary. Moreover, given the point match, the point q and disparity cause are available. One can perform a simple calibration of the scene by providing the real locations of four ground plane points. This information need not be very accurate and an approximate estimate is sufficient. This will give us a homography between the actual ground plane and its image in the camera (see for example, FIG. 4) Using this information, the distance $P_z$ of an observed point can be approximated if the distance of the object from the ground plane is assumed to be small. $P_z$ is determined up to a global scale factor. It is possible to determine such scale factor automatically from the scene by tracking objects and observing their changes in the disparity as they move about. (see FIG. 5 showing a disparity map between FIGS. 3a and 4). This can be performed if it is assumed that the object does not change its shape drastically during the motion. This is a reasonable assumption for moving cars and people.

Figure 6:
FIG. 6 is the image of FIG. 4 corrected according to a disparity map of FIG. 5, according to an embodiment of the present invention.

Thus, apart from an unknown global scale factor $T_z$, which can be estimated if the exact location of the second camera is available, one can correct for other alterations in the parallax as an object moves in the scene (see for example, FIG. 6). Hence, for a particular object having a non-altering height (for example, cars or walking people), one can obtain a quantity that remains unaltered as the object moves around the scene. This information can be used to track an object as it moves in the scene and to recover from occlusions. Furthermore, such representation allows us to recognize/classify an object since the structure of the object is captured in this invariant space.

To follow an object, track it in the scene across multiple cameras and obtain close views of it, a control strategy is needed for the PTZ cameras. To develop this strategy, the information across the different views needs to be correlated. Such correlation can be developed either by full calibration or by a homography relationship that establishes the correspondence on the registered plane. If it is assumed that objects are close to this plane, such correspondence is sufficient to provide control information to the cameras based on detections in other cameras. For example, based on detection in a wide field of view camera, a second PTZ camera can be controlled and zoomed in on the object. The detection of the system can be improved by utilizing priors for object motion. For instance, in the parking lot case, the cars will usually driving along aisles. If the surveillance system has the knowledge of the aisle, or more generally, the activity probability density function (PDF) over the whole parking lot, multiple cars can be tracked using a single camera. Given the activity PDF, and the previous positions of the targets, a control strategy can be designed that minimizes the target losing probability, and maintains a high confidence trajectory of multiple simultaneous events. The strategy can ask the camera to look at the aisles more often, while the woods less often, for example. This control can be called event-driven monitoring. If the tracker loses the target, the target can be located by systematic scanning over the whole scene. Such activity PDF can be learned from the data automatically.

Such activity PDF can be combined with online information available from tracking. Furthermore, a mapping from the applied PTZ parameters to the motion of the visual scene can be estimated. This mapping will be a non-linear function. These can be fused together to estimate the PTZ control parameters to be applied to the camera so that the camera has the highest probability of viewing the object in the next view. Furthermore, the highest zoom that can be applied to the camera without losing any part of the object can be determined by estimating the error in the estimate of the object's location and the error in the PTZ control (i.e., the difference between the actual motion of the camera and the applied motion). Such error can be obtained by estimating the error in estimating the object's location and velocity in the image and in the parallax (3D) computation and propagating that error through the mapping functions. Such propagation also introduces error since there can be some error in the registration of images and the common plane and in the ground plane position specification. Furthermore, to perform registration of images as the camera zooms in on an object, a minimum amount of background needs to appear in the image for such registration to be accurate. These factors are taken into account while estimating the final error and the maximum zoom that can be applied to the camera without losing the object.

Multiple events may occur simultaneously in the scene. In such a case, a control strategy is needed to decide the events that need to be monitored. Such a scheme can, for example, maximize the probability of object detection by learning the probabilities of the location of object appearance and their subsequent motion through the scene. Such a control scheme can also incorporate user specifications. For example, one may monitor an object closely when it is estimated that the object will be visible at a particular pose (e.g., frontal for a person, or the number plate for a car). After collection of such information, the cameras can switch to another object that may have been monitored by a third camera. If a third camera is not available, the cameras may search for a new object using prior information at the locations where a new object is most likely to appear, for example, near an entrance.

Different objectives are defined through the user specification. For example, a system and method can acquire a frontal view of people in the scene according to the user specification and a determined change in the scene. Similarly, the license plates of all cars that enter a parking lot can be captured. In another example, close-up imagery of a particular area can be captured upon determining motion/activity in a defined region of the scene. Close-up imagery can be obtained upon determined a pattern of motion different from a learned motion, for example, in a road-monitoring application where a vehicle leaves a defined area framing a roadway. In another example, close-up imagery can be acquired if a person bends down or exhibits some activity defined by a pattern of the user specification.

Thus, a strategy, or user interface, can be developed to decide which event to monitor, whether or how to switch among events, how to combine systematic scanning with event-driven tracking, etc. Each event is associated with a set of actions to be taken. For example, for the car entering event, the car needs to be tracked, the license plate is identified and zoomed in on, and the driver is identified and zoomed in on. Further, images of the license plate and driver can be obtained.

The system and method have applications in all indoor and outdoor surveillance applications. For example, it can be useful for intrusion detection in places such as parking lots, railway stations, subway stations, and airports and for security in areas such as military installations, museums, shopping malls, and homes. Furthermore, it can be used for object/event detection/recognition in a variety of applications. These include industrial/automation applications, traffic monitoring (e.g., counting, recognition and classification of cars/trucks/pedestrians etc.), and security systems (either commercial, residential or military). The system and method have further applications in automation since it can form the basis for providing information about the environment and feedback to control systems. Applications include plane docking in airports, industrial automation in a variety of scenarios, vision-based robotic systems etc. In such applications, it has superior performance than traditional single camera intensity-based solutions since it is based on parallax and 3D information as opposed to appearance, which can change due to change in illumination, lighting, specularities, weather conditions etc.

According to an embodiment of the present invention, an event in a scene is detected robustly in the presence of shadows, illumination change etc. Parallax is used as a basis of detection using multiple cameras. One or more of the cameras can be capable of PTZ. The plane+parallax model is useful due to the ready availability of the ground plane and fixed position of the cameras since the internal camera parameters and rotation is cancelled by registration of the ground plane. Inter-frame registration of views taken from a single PTZ camera allows for detection with camera rotations and zoom. The parallax thus obtained is further utilized for event detection using measures that are invariant to the position of the object in the scene. Thus, objects can be robustly tracked, recognized and classified based on this information. Furthermore, control strategies can be developed that maximize the probability of the object to be present in the next view of the scene at the highest possible resolution.

Figure 7:
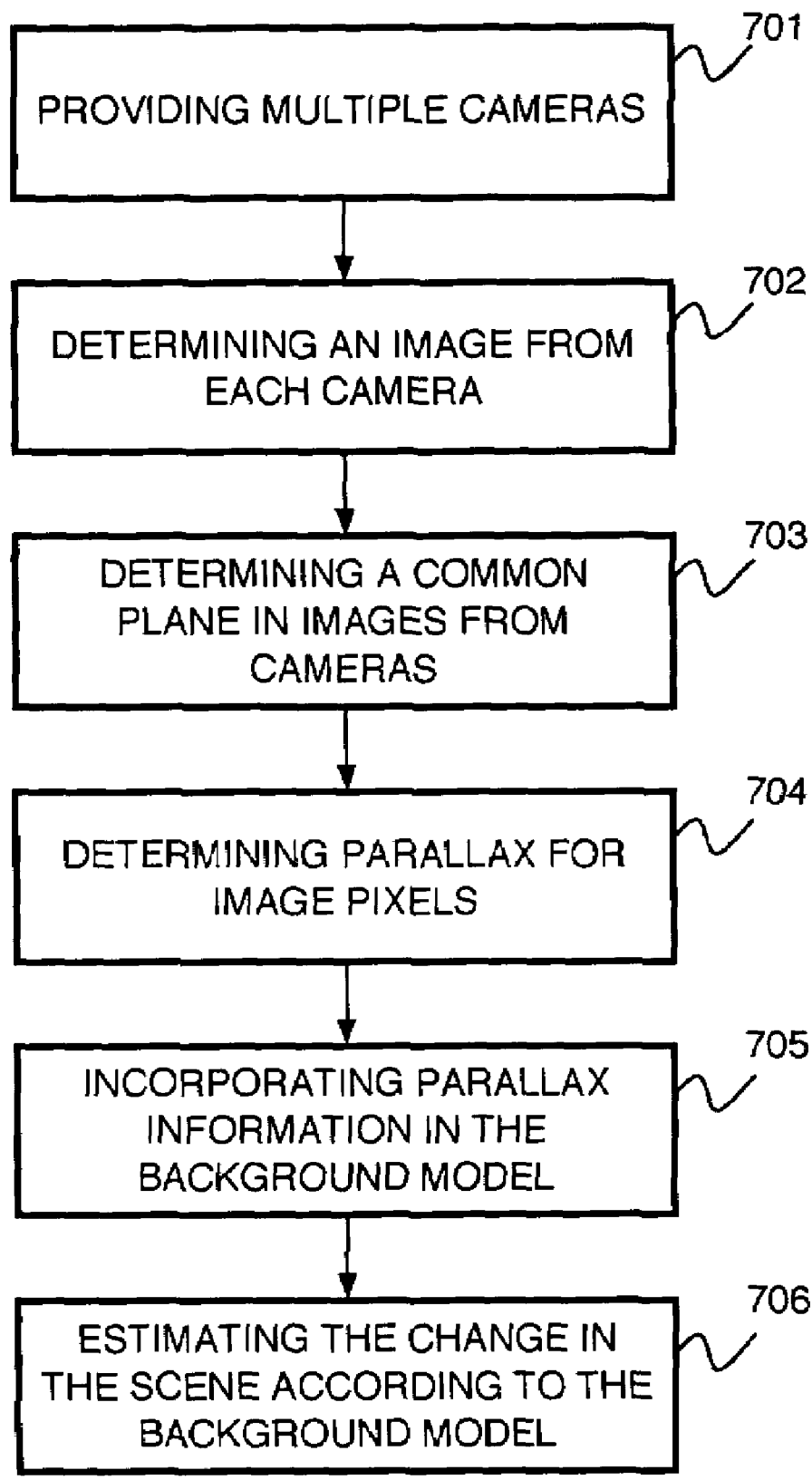
FIG. 7 is a flow chart of a method according to an embodiment of the present invention.

According to an embodiment of the present invention and referring to FIG. 7, a method of tracking an object comprises providing at least two cameras 701. The cameras can be uncalibrated. The method further comprises determining an image from each camera 702, and determining a common plane in the acquired images 703. The method further comprises determining parallax for all points in the images 704, and incorporating parallax in a background model 705. The background model can comprise other features such as intensity and edges. The method comprises estimating a change in the scene in the parallax background joint space 706.

Figure 8:
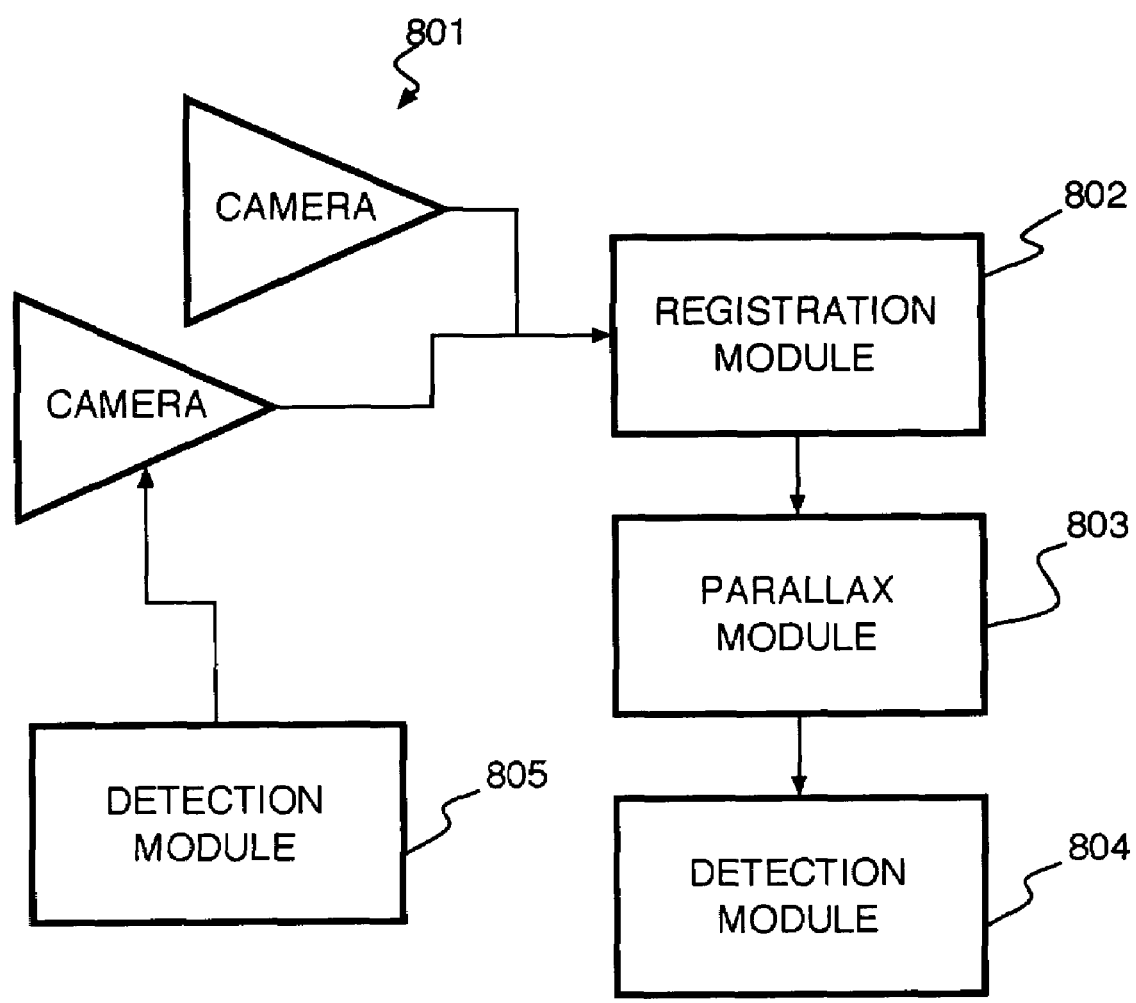
FIG. 8 is a diagram of a system according to an embodiment of the present invention.

Referring to FIG. 8, a system for tracking an object comprises two or more cameras 801, and a registration module 802 for aligning a common plane in an image obtained from each camera. The system comprises a parallax module 803 for determining a parallax between views of each camera, and detection module 804 for determining an object in a scene defined by the views of the cameras according to the parallax and a predetermined background model. At least one camera is uncalibrated. At least one camera is a pan-tilt-zoom camera. A control strategy means 805 tracks the object with the pan-tilt-zoom camera.

Having described embodiments for a system and method for multiple camera video surveillance, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method of tracking an object comprising:
providing a plurality of cameras;
determining an image from each camera;
determining a common plane in the images;

determining a parallax for scene points across the images;
incorporating the parallax as a feature in a background model;
determining a change in the background model incorporating the parallax; and
tracking the object according to the change, wherein the change in the background model incorporating the parallax corresponds to the object, wherein the tracking of the object according to the change further comprises,
obtaining a measure from the parallax that is invariant to motion of the object through the image, and
tracking the object relative to the invariant measure.

2. The method of claim 1, wherein at least one camera is a pan-tilt-zoom camera.

3. The method of claim 1, wherein at least one camera is uncalibrated.

4. The method of claim 2, further comprising:
providing a pan-tilt-zoom camera;
determining a mosaic for the pan-tilt-zoom camera from images captured from the pan-tilt-zoom camera; and
registering the mosaic and the images from the pan-tilt-zoom camera and the plurality of cameras according to the common plane in the image.

5. The method of claim 2, further comprising inter-frame registration of images captured from the pan-tilt-zoom camera.

6. The method of claim 1, wherein the background model comprises a feature.

7. The method of claim 6, wherein the feature is one of an intensity and an edge.

8. The method of claim 1, further comprising determining the background model by one of a mixture-of-Gaussians and a non-parametric kernel.

9. The method of claim 8, wherein an error associated with object detection and velocity is propagated to determine a maximum possible zoom at which an image of the desired region of the object may be acquired.

10. The method of claim 1, further comprising providing a control strategy for controlling at least one camera of the plurality of cameras to view a portion of a scene estimated to include a visible portion of the object subsequent to an occlusion of the object.

11. The method of claim 1, further comprising obtaining a relationship between observations from different cameras via a homography relationship for the common registered plane.

12. The method of claim 1, further comprising providing a control strategy for acquiring user defined relevant information for the object.

13. The method of claim 12, wherein providing the control strategy further comprises:
providing a probability density function for the object; and
providing a model for object motion.

14. The method of claim 12, wherein providing the control strategy further comprises providing a user specification.

15. The method of claim 14, further comprising controlling the cameras according to the user specification and the change in the background model.

16. A program storage device readable by machine, tangibly embodying a program of instructions executable by the machine to perform method steps for tracking an object, the method steps comprising:
providing a plurality of cameras;
determining an image from each camera;
determining a common plane in the images;
determining a parallax for scene points across the images;
incorporating the parallax as a feature in a background model; and
determining a change in the background model incorporating the parallax; and
tracking the object according to the change, wherein the change in the background model incorporating the parallax corresponds to the object, wherein the tracking of the object according to the change further comprises,
obtaining a measure from the parallax that is invariant to motion of the object through the image, and
tracking the object relative to the invariant measure.

17. A system for tracking an object comprising:
a plurality of cameras capturing images including the object;
a memory device storing a plurality of instructions embodying an object tracker;
a processor in communication with the memory device and the plurality of cameras for receiving the images including the object and executing the object tracker to perform a method comprising:
determining a common plane in the images;
determining a parallax for scene points across the images;
incorporating the parallax as a feature in a background model;
determining a change in the background model incorporating the parallax; and
tracking the object according to the change, wherein the change in the background model incorporating the parallax corresponds to the object, wherein the tracking of the object according to the change further comprises,
obtaining a measure from the parallax that is invariant to motion of the object through the image, and
tracking the object relative to the invariant measure.

18. The system of claim 17, wherein at least one camera is a pan-tilt-zoom camera.

19. The system of claim 17, wherein at least one camera is uncalibrated.

20. The system of claim 18, wherein the processor further executes the object tracker to perform the method further comprising:
determining a mosaic for the pan-tilt-zoom camera from images captured from the pan-tilt-zoom camera; and
registering the mosaic and the images from the pan-tilt-zoom camera and the plurality of cameras according to the common plane in the image.

* * * * *